United States Patent
Delaisement

[11] Patent Number: 5,887,852
[45] Date of Patent: Mar. 30, 1999

[54] MIXER TAP CARTRIDGE WITH ADJUSTABLE FLOWRATE LIMITATION

[75] Inventor: Yves Delaisement, Villecresnes, France

[73] Assignee: Norton Desmarquest Fine Ceramics, Cedex, France

[21] Appl. No.: 920,767

[22] Filed: Aug. 29, 1997

[30] Foreign Application Priority Data

Sep. 20, 1996 [FR] France .................................. 96-11503

[51] Int. Cl.$^6$ .................................................. F16K 11/02
[52] U.S. Cl. .................. 251/285; 137/625.17; 137/625.4
[58] Field of Search ........................... 137/625.17, 625.4, 137/625.41; 251/285, 288

[56] References Cited

U.S. PATENT DOCUMENTS

| | | | |
|---|---|---|---|
| 4,708,172 | 11/1987 | Riis ................................... | 137/625.4 X |
| 4,971,113 | 11/1990 | Pawelzik et al. ................. | 137/625.4 X |
| 5,082,023 | 1/1992 | D'Arc .................................. | 137/625.4 |
| 5,386,852 | 2/1995 | Bosio .................................. | 251/285 X |
| 5,490,540 | 2/1996 | Vom Dahl et al. ................. | 251/285 X |
| 5,522,429 | 6/1996 | Bechte et al. ...................... | 251/288 X |

FOREIGN PATENT DOCUMENTS

| | | |
|---|---|---|
| 110339 | 6/1984 | European Pat. Off. . |
| 4540023 | 6/1984 | European Pat. Off. . |
| 2665500 | 2/1992 | France . |
| 3211619A1 | 10/1983 | Germany . |

Primary Examiner—John Rivell
Assistant Examiner—Meredith H. Schoenfeld
Attorney, Agent, or Firm—Thomas M. DiMauro

[57] ABSTRACT

A mixer tap cartridge including a body (10) having a bush (23) with a reference axis, internal flowrate adjustment members disposed inside the body and a lever (20) cooperating with these internal members to adjust the flowrate hinged to the bush (23) about a transverse pin (24) and having an exterior part (21) projecting out of the body, the lever and the bush having complementary bearing surfaces (25, 26) conjointly defining an extreme flowrate configuration of the lever, characterised in that the bearing surface (25) of the lever is part of a projecting portion of a pin (27) sliding in a transverse hole (28) in the lever, this pin cooperating with an adjustment member (31) mobile in a housing (30) in the lever accessible from outside the cartridge.

12 Claims, 2 Drawing Sheets

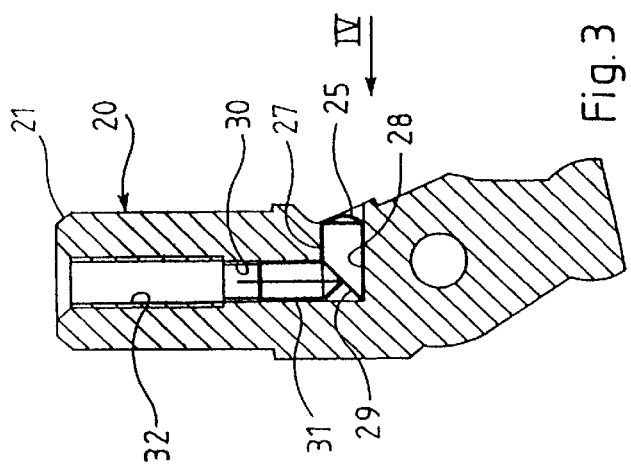
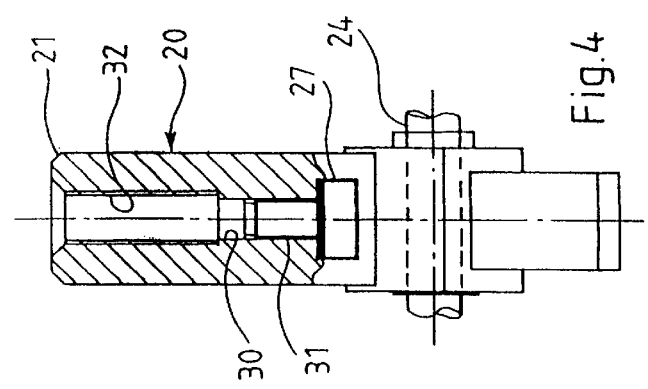
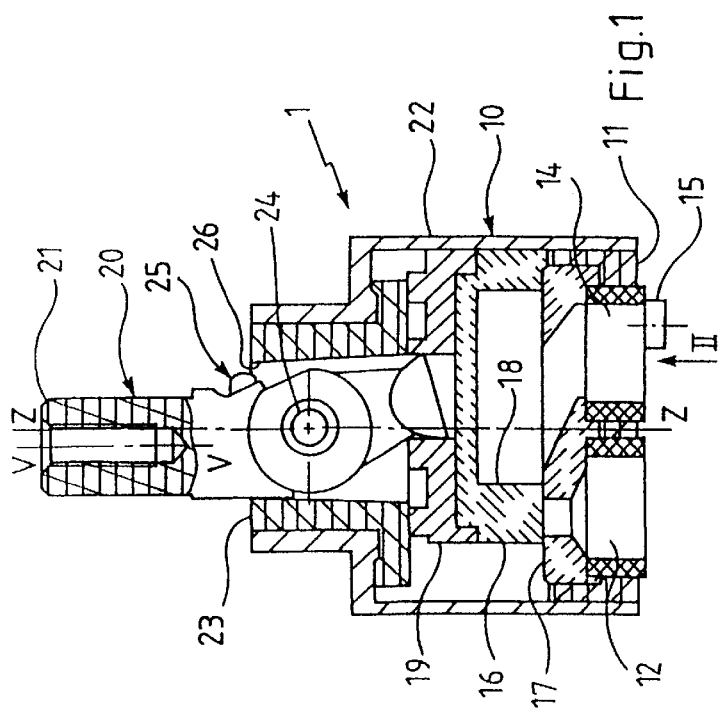
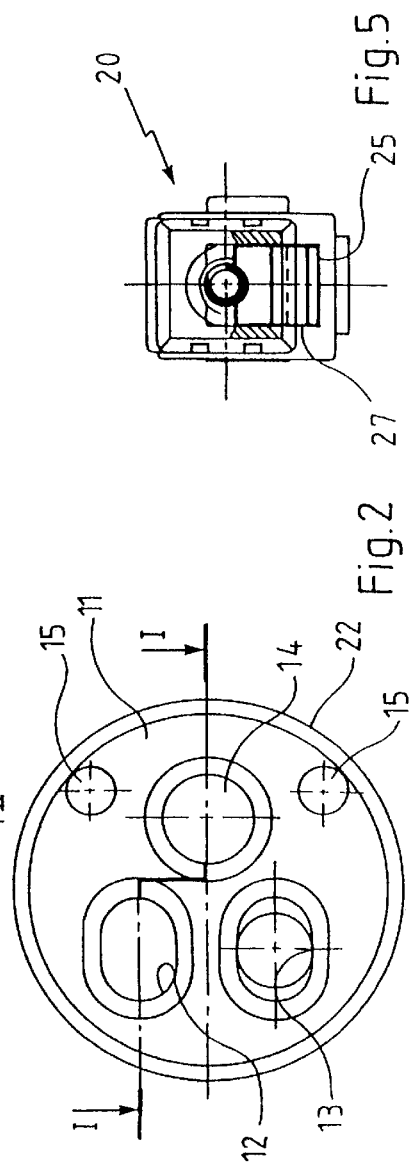

MIXER TAP CARTRIDGE WITH ADJUSTABLE FLOWRATE LIMITATION

BACKGROUND OF THE INVENTION

The invention concerns a mixer tap cartridge with adjustable flowrate limitation.

A mixer tap cartridge is an assembly adapted to be placed in a mixer tap body between two water inlet passages, respectively for cold water and for hot water, and a mixed water outlet passage that is generally in a portion projecting from the tap body that in practice is called the spout.

The cartridge adjusts the flowrates of the cold water and the hot water to be mixed. In other words, from the point of view of the user, the cartridge adjusts the overall flowrate and the proportion of hot and cold water, i.e. the temperature at the overall flowrate.

To this end the cartridge in practice includes a fixed disk, advantageously of ceramic, and a mobile disk pressed against the fixed disk and able to move over the latter in translation and in rotation. The fixed disk includes at least two openings respectively communicating with the hot and cold water inlet passages and the mobile disk has a geometry adapted to close off each of the openings in the fixed disk to a greater or lesser degree, according to its position and its orientation.

The position and the orientation of the mobile disk relative to the fixed disk are in principle controlled by a single lever projecting out of the cartridge and coupled to an operating member such as a handle mobile relative to the body of the tap and accessible to a user.

In practice this lever (and the same goes for the operating member) has a reference axis that is fixed relative to the body of the cartridge and the inclination of the lever relative to this axis determines the overall flowrate while its angular position about this axis determines the relative proportions of hot and cold water.

The cartridge generally includes a cartridge body and, within the latter, a bush (or collar) adapted to turn about a first axis of the body, preferably coincident with the aforementioned reference axis of the lever, and the lever passes through this bush to which it is hinged about a transverse pin fixed relative to the bush.

The bush defines a limited range of relative angular movement of the lever about the transverse pin, between a minimal (in practice nil) flowrate configuration corresponding to a minimal inclination relative to the reference axis and a maximal flowrate configuration corresponding to a maximal inclination of the lever relative to the reference axis.

Evidently, for a given cartridge including a given bush and a given lever, this range of relative movement is in principle fixed.

The need has arisen to be able to adjust the maximum flowrate allowed by a cartridge according to its use.

Solutions have already been put forward to enable such adjustment.

A first solution consists in providing a longitudinally mobile bearing portion on the lever; this is an attached part having a ramp inclined to the longitudinal axis of the lever; according to the longitudinal position of this part on the lever, the portion of the ramp that abuts a corresponding portion of the bush is closer to or farther away from the longitudinal axis of the lever, whence a greater or lesser maximal inclination of the lever relative to its reference axis; this solution is relatively complex since it is necessary to provide a reliable means of attachment of the attached part to the exterior surface of the lever (it must not be possible for it to become detached), which would appear at first sight to be incompatible with easy adjustment of the longitudinal position of the attached part.

A second solution appears to consist in providing a bearing portion on the bush that is mobile either radially or axially, for example due to the action of a screw-nut system. However, these solutions have the drawback of necessitating a specific arrangement of the bush compared to its conventional configuration, which makes the bush more fragile. The possibility of the bush breaking and the seal between the disks deteriorating, which would cause leaks, cannot be tolerated. Furthermore, the position of the mobile abutment can in practice only be adjusted when the cartridge is removed from the tap body, or even when the bush is removed from the cartridge. Thus it can sometimes be necessary to perform many mounting/demounting operations of the cartridge into/out of the body before the correct adjustment of the maximal flowrate is obtained.

An object of the invention is to alleviate these drawbacks by using an extreme flowrate (in practice maximum flowrate) adjustment stop that is easy to install in a reliable manner, at the latest possible stage in the manufacture of the component parts of the cartridge, without making the bush more fragile, and the position of which can be easily adjusted, preferably even when the cartridge is in place in a tap body.

SUMMARY OF THE INVENTION

To this end the invention proposes a mixer tap cartridge including a body having a bush with a reference axis Z—Z, internal flowrate adjustment members disposed inside the body and a lever cooperating with these internal members to adjust the flowrate hinged to the bush about a transverse pin and having an exterior part projecting out of the body, the lever and the bush having complementary bearing surfaces conjointly defining an extreme flowrate configuration of the lever, characterised in that the bearing surface of the lever is part of a projecting portion of a pin sliding in a transverse hole in the lever, this pin cooperating with an adjustment member mobile in a housing in the lever accessible from outside the cartridge.

The pin can obviously be fitted to any conventional lever, simply by providing a transverse hole through it or a transverse blind hole in it. There is no need to modify the bush. The adjustment member can also be fitted to any conventional lever, simply by boring a housing (blind or otherwise) in the transverse direction or in the longitudinal direction of the lever, for example extending the longitudinal bore conventionally provided to receive a screw for coupling the lever to the operating member accessible to the user (this housing can also have any inclination less than 90° to the longitudinal axis of the lever). There is therefore no need to modify the conventional steps of fabricating the lever. Moreover, especially when the adjustment member is near the mouth of the bush and/or mobile longitudinally in the lever, it is not necessary to demount the cartridge to obtain access to it: all that is required is to demount the operating member accessible to the operator. In any event, it is not necessary to disassemble the cartridge. It should be noted at this point that the concept of a transverse hole for the pin does not necessarily imply that it has an inclination equal to 90° relative to the longitudinal axis of the lever. The invention can even enable adjustment of the position of the operating member without having to demount the tap handle.

DETAILED DESCRIPTION OF THE INVENTION

In accordance with preferred, essentially combined, features of the invention:

the pin includes a ramp inclined relative to the longitudinal axis of the housing in the lever and the latter has a non-zero inclination relative to the direction of the transverse hole.

the housing in the lever is at least approximately longitudinal, the housing is bored and the adjustment member is an adjustment screw, the adjustment screw has a frustoconical end the cone angle of which is substantially equal to the inclination of the inclined ramp relative to the longitudinal axis of the housing in the lever, the longitudinal housing of the adjustment member extends a housing bored in the end of the lever, the transverse hole is formed in the lever between the transverse pin and the end of the lever, the pin has a non-circular cross-section, the pin has a polygonal cross-section, the pin has a substantially rectangular cross-section the greatest distance of which is perpendicular to the longitudinal axis of the lever, the projecting portion of the pin is convex, the projecting portion of the pin is part of a cylinder transverse to the longitudinal axis of the lever.

Figure 6:
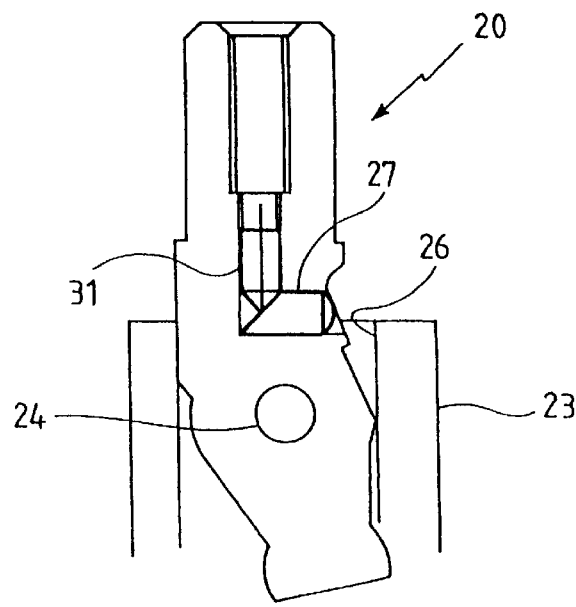
Figures 7, 8:
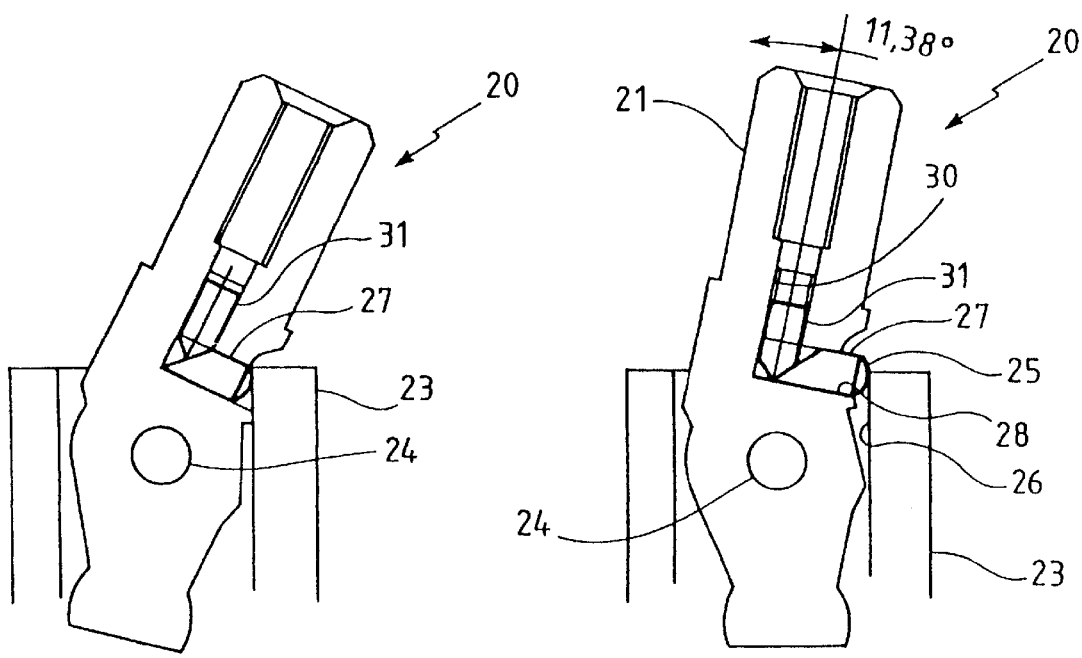

Objects, features and advantages of the invention will emerge from the following description given by way of example with reference to the accompanying drawings, in which:

FIG. 1 is a view of a cartridge in accordance with the invention in axial section taken along the broken line I—I in FIG. 2, FIG. 2 is a bottom view as seen in the direction of the arrow II in FIG. 1, FIG. 3 is a view of the operating lever of this cartridge in axial section, FIG. 4 is a partially cut away elevation view of this lever as seen in the direction of the arrow IV in FIG. 3, FIG. 5 is a top view of this lever, FIG. 6 is a fragmentary schematic view of the part of the cartridge that includes the lever, the latter being in a minimum flowrate configuration, FIG. 7 is a view analogous to that of FIG. 6, the lever being in a maximum flowrate configuration, and FIG. 8 is a view analogous to that of FIG. 6, the lever being in an adjustable maximum flowrate intermediate position.

FIG. 1 shows a mixer tap cartridge 1 adapted to be mounted in a tap body (not shown) to control the cross-section of communication between hot water and cold water inlet passages, on the one hand, and a mixed water outlet passage, on the other hand.

The cartridge includes a body 10 the bottom 11 of which, in the example shown, has two inlet openings 12 and 13, for cold water and for hot water, respectively, and a mixed water outlet 14. The bottom is often provided also with studs 15 to facilitate positioning the cartridge in a tap body.

The cross-sections of communication between the openings 12 and 13 and the opening 14 are determined by the relative position and orientation of a mobile disk 16 that is mobile relative to a fixed disk 17. These disks are advantageously ceramic disks. The mobile disk in practice includes a chamber 18 adapted to cap the openings 12, 13 and 14 at least in part.

The movements of the mobile disk 16 relative to the fixed disk 17 are here controlled indirectly through a cover-plate disk 19 (capping the mobile disk which is often called the "plate") by an operating lever 20, one part 21 of which is accessible from outside the body of the cartridge.

This operating lever has two degrees of freedom.

Firstly, it can turn about a reference axis Z—Z fixed relative to the cartridge; the cartridge generally includes a cylindrical lateral surface 22 the axis of which defines the reference axis and a bush 23 coaxial with the cylindrical lateral surface 22 and through which the lever passes. This bush is coupled axially to this lateral surface but can turn relative to it about the reference axis. This degree of freedom is not of particular relevance to the invention.

The invention is concerned with the movement of the lever relative to the bush about a transverse pin 24.

This angular movement is limited between two configurations in which the lever abuts the inside of the bush, in one direction or the other.

FIGS. 1 and 6 correspond to a configuration in which the flowrate is minimal (or nil since the mobile disk closes off the water inlet holes in the fixed disk), while the lever is substantially vertical, against the left pivot stop, having its longitudinal axis V—V substantially parallel to the reference axis Z—Z.

The lever 20 has on its outside surface a bearing portion 25 adapted to bear against a complementary bearing surface 26 fixed relative to the bush so as to limit pivoting of the lever towards the right and therefor to limit the maximum flowrate through the cartridge.

In accordance with the invention, this bearing portion of the lever is part of a projecting portion of a pin 27 sliding in a transverse hole 28 in the lever; this pin includes a ramp 29 inclined relative to the longitudinal axis V—V of the lever; a housing 30, in this example a longitudinal example, is also formed in the lever, accessible via the exterior part 21 of the lever and containing an axially mobile adjustment member 31 cooperating with the ramp of the pin with a cam effect.

Clearly, if the pin is retracted completely within the transverse hole 28 (see FIGS. 3, 6 and 7), the bearing portion through which the lever bears against the complementary bearing surface of the bush includes a fixed portion of the outside surface of the lever (see FIGS. 6 and 7), as in the conventional solutions.

On the other hand, FIGS. 1 and 8 show that the relative angular movement of the lever on pivoting about the pin 24 is inversely proportional to the projection of the pin out of the transverse hole. In the FIG. 8 example, this range of relative movement is 11.38°; it can be fixed at any value between 0° (FIG. 6) and the maximum relative angular movement of FIG. 7, for example 25°.

A particularly simple embodiment of the adjustment member is a grub screw 31 engaged in a screwthread formed in the inside surface of the longitudinal housing 30.

In this example the grub screw has a convex end. It advantageously has a frustoconical end with the cone angle substantially equal to the inclination of the ramp 29 relative to the longitudinal axis V—V of the lever. This guarantees that the adjustment member 31 and the pin 27 are in contact over an area rather than at a point.

The longitudinal housing 30 of the adjustment member advantageously extends a bored housing 32 conventionally provided inside the external part 21 of the lever and adapted to receive a coupling screw for temporarily attaching the lever to an operating lever or handle adapted to be manipulated by a user.

In a variant that is not shown, the housing 30 of the adjustment member has a non-zero inclination relative to the longitudinal axis of the lever; this inclination can even be 90°. When this housing extends the transverse hole receiving the pin, the position of the pin can be adjusted by rotating an adjustment screw axially fixed in its housing and entering a screwthreaded hole in the pin.

In a manner that is in itself conventional, the bearing surface 25 is between the transverse pin 24 and the end 21 of the lever.

The pin advantageously has a non-circular crosssection, for example an oval, elliptical or polygonal cross-section. This prevents the pin turning; the ramp (when present) therefore maintains a constant inclination relative to the lever. However, in some cases screw/ramp cooperation may be sufficient to prevent rotation of a circular pin.

This cross-section is preferably rectangular with its greatest dimension parallel to the transverse pin: there is then a large surface area of contact with the complementary bearing surface on the bush.

The projecting portion of the pin is advantageously convex so as to make good contact regardless of the position of the pin in the transverse hole.

The projecting portion of the pin is preferably part of a cylinder transverse to the longitudinal axis of the lever. This combines the aforementioned two advantages.

It goes without saying that the skilled person can propose many variants without departing from the scope of the invention.

I claim:

1. A mixer tap cartridge comprising a body having a bush defining a reference axis, internal flowrate adjustment members disposed inside the body and a lever cooperating with the internal flowrate adjustment members to adjust the flowrate, the lever hinged to the bush about a transverse pin and having an exterior part projecting out of the body, the lever and the bush each having complimentary bearing surfaces conjointly defining an extreme flowrate configuration of the lever, wherein the bearing surface of the lever is part of a projecting portion of a pin sliding in a transverse hole in the lever, the pin cooperating with a mobile adjustment member mobile in a housing in the lever accessible from outside the cartridge.

2. The cartridge according to claim 1, wherein the pin includes a ramp inclined relative to the longitudinal axis of the housing in the lever, the housing having a non-zero inclination relative to the direction of the transverse hole.

3. The cartridge according to claim 2, wherein the housing is at least approximately longitudinal.

4. The cartridge according to claim 2, wherein the housing is bored and the mobile adjustment member is a screw.

5. The cartridge according to claim 4, wherein the screw has a frustoconical end defining a cone angle substantially equal to the inclination of the inclined ramp relative to the longitudinal axis of the housing in the lever.

6. The cartridge according to claim 4 wherein the housing of the adjustment member extends a bored housing in the end of the lever.

7. The cartridge according to claim 1, wherein the transverse hole is formed in the lever between the transverse pin and the end of the lever.

8. The cartridge according to claim 1, wherein the pin has a non-circular cross section.

9. The cartridge according to claim 1, wherein the pin has a polygonal cross section.

10. The cartridge according to claim 9, wherein the pin has a substantially rectangular cross section, the greatest distance of which is perpendicular to the longitudinal axis of the lever.

11. The cartridge according to claim 1, wherein the projecting portion of the pin is convex.

12. The cartridge according to claim 11, wherein the projecting portion of the pin is part of a cylinder transverse to the longitudinal axis of the lever.

* * * * *